(12) United States Patent  
Eslambolchi

(10) Patent No.: US 6,445,779 B1
(45) Date of Patent: Sep. 3, 2002

(54) METHOD AND APPARATUS FOR PROVIDING OUTBOUND VOICE-TO-FAX SERVICE

(75) Inventor: Hossein Eslambolchi, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/417,882

(22) Filed: Oct. 14, 1999

(51) Int. Cl.[7] .......................... H04M 1/64; H04M 3/42; H04M 11/00
(52) U.S. Cl. .................. 379/100.01; 379/67.1; 379/93.15; 379/100.13; 379/100.15; 379/142.14; 379/201.01
(58) Field of Search .............. 379/67.1, 93.01, 379/93.02, 93.05, 93.06, 93.08, 93.09, 93.15, 100.01, 100.08, 100.13, 100.15, 142.14, 201.01

(56) References Cited

U.S. PATENT DOCUMENTS

| | | | | |
|---|---|---|---|---|
| 5,018,191 A | * | 5/1991 | Catron et al. | 379/100 |
| 5,033,079 A | * | 7/1991 | Catron et al. | 379/100 |
| 5,517,556 A | * | 5/1996 | Pounds et al. | 379/67 |
| 5,583,920 A | * | 12/1996 | Wheeler, Jr. | 379/88 |
| 5,631,745 A | * | 5/1997 | Wong et al. | 358/434 |
| 6,215,858 B1 | * | 4/2001 | Bartholomew et al. | 379/88.17 |

* cited by examiner

Primary Examiner—Allan Hoosain

(57) ABSTRACT

A subscriber, using a voice telephone set (12) may transmit a facsimile message to a recipient facsimile machine (14) by dialing a telephone number associated with a platform (22) in a telephone network (20) that provides outbound voice-to-facsimile service. Upon receipt of the call, the platform (22) prompts the caller for the message and the identity of the recipient facsimile machine (14). The platform (22) translates the message into a format appropriate for facsimile transmission and then launches a call to the recipient facsimile machine (14) to deliver the facsimile.

5 Claims, 1 Drawing Sheet

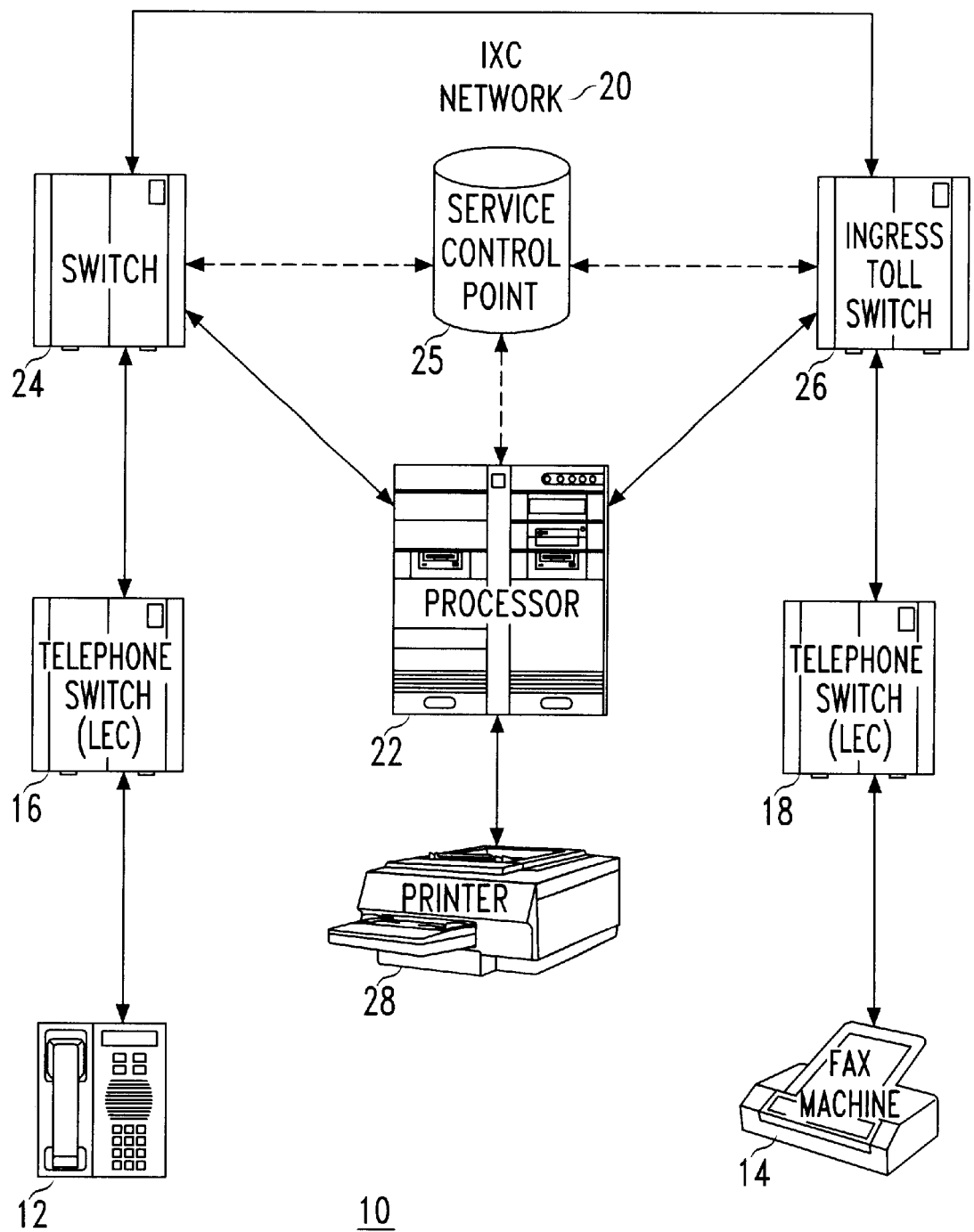

METHOD AND APPARATUS FOR PROVIDING OUTBOUND VOICE-TO-FAX SERVICE

TECHNICAL FIELD

This invention relates to a technique for enabling a voice telephone subscriber to send an outbound message to a facsimile machine.

BACKGROUND ART

Facsimile transmission is a well-known mechanism for transmitting documents via the Public Switched Telephone Network (PSTN). To transmit a document, an operator at an originating facsimile machine enters a telephone number associated with a receiving machine. Upon establishing a connection, the first facsimile machine optically scans each page of the document to yield a corresponding bit-map file or the like for transmission to the receiving facsimile machine. The receiving machine prints the bit map file by thermal printing on special paper or on plain paper using carbon transfer, ink jet or a laser printing mechanism. More recently, personal computers, and even personal data assistant devices, when programmed with special software, can now originate and receive facsimile transmissions, obviating the need for a dedicated machine for this purpose.

Unless a user has access to a facsimile machine or other hardware that is capable of initiating a facsimile transmission, the user must rely on alternate means of communications, such as voice or e-mail, to communicate the information in a document to a receiving party. While these alternatives have their place, facsimile transmission has certain advantages. In many legal agreements, facsimile transmission serves as a recognized mode of providing notice whereas voice and e-mail do not. Moreover, there are often instances when providing a receiving party with a hard copy document is critical, a capability not available with voice communications.

Thus, there is a need for providing a user with the capability of sending a facsimile transmission without the need for the user to possess any special hardware, other than a telephone connected to the PSTN.

BRIEF SUMMARY OF THE INVENTION

Briefly, the present invention concerns a technique for enabling a voice subscriber to send a facsimile from his/her telephone without the need for a facsimile machine or the like. To send a facsimile, the voice subscriber dials a telephone number, typically, although not necessarily, a toll-free number, associated with a platform within a telecommunications network that provides outbound speech-to-facsimile service. Upon receipt of the subscriber's call, the platform prompts the subscriber to speak a voice message for facsimile transmission. Additionally, the platform also prompts the subscriber for the identity of the recipient. The prompt may ask that the subscriber enter the recipient's facsimile number via DTMF signals entered through the telephone keypad. Rather than prompting the subscriber to enter DTWF digits, the platform may prompt the subscriber to speak the digits of the recipient's facsimile number. Alternatively, the platform may prompt the subscriber for the name or other non-telephone number identifier of the subscriber, whereupon the platform would launch a database to establish the recipient's facsimile number from such information. Thereafter, the platform would translate the subscriber's spoken message into a bit map file or other appropriate format for transmission as a facsimile message. The platform would then launch a call to the recipient's facsimile machine and send the message. Depending on the manner in which the outbound voice-to-facsimile service is made available, the platform may prompt the subscriber for validating information prior to prompting for the message itself to determine if the subscriber is authorized to seek this service.

BRIEF DESCRIPTION OF THE DRAWING

FIG. 1 illustrates a block schematic diagram of a communications network for practicing the method of the invention.

DETAILED DESCRIPTION

FIG. 1 illustrates a telecommunications network 10 for providing outbound speech-to-facsimile service to permit a voice subscriber, using a telephone set 12, to send a facsimile transmission for receipt on a facsimile machine 14, simply by speaking that message. In the illustrated embodiment, the telephone set 12 receives local service (i.e., dial tone) from a local telephone switch 16 maintained by a Local Exchange Carrier (LEC). Note that the telephone set 12 could obtain service from alternative sources, such as a cable television provider or DSL provider (not shown). Although the telephone set 12 is depicted as a wired device, the telephone set could comprise a wireless handset (not shown) that receives service from a mobile telephone switching office (not shown).

In the illustrated embodiment, the facsimile machine 14 comprises a stand-alone device dedicated to receipt of facsimile transmissions. Alternatively, the facsimile machine 14 could comprise a computer, Personal Data Assistant device (PDA) or other such device programmed to receive facsimile transmissions. The facsimile machine 14 receives local service (i.e., dial tone) from a local telephone switch 18 maintained by a Local Exchange Carrier (LEC), which may be the same as, or an entity different from the entity responsible for the switch 16. Indeed, depending on their geographic proximity, the facsimile machine 14 and telephone set 12 could both receive local service from the same local switch. Note that the facsimile machine 14, like the telephone set 12, could obtain service from alternative sources, such as a cable television provider or DSL provider (not shown).

In the preferred embodiment, the subscriber obtains outbound voice-to-fax service from an Inter-ExChange (IXC) network 20, such as the inter-exchange network maintained by AT&T. To obtain the voice-to-facsimile service, the subscriber dials a telephone number, typically, although not necessarily, a toll-free number, associated with a platform 22 in the network 20 that provides such service. In practice, the platform 22 may comprise a telecommunications switch or dedicated processor having speech recognition capability. Upon receipt of the call initiated by the subscriber to the platform 22, the local switch 16 will recognize this number dialed by the subscriber as a number intended for the IXC network 20. Accordingly, the local switch 16 will route the call to the IXC network 20 for receipt at ingress toll switch 26, such as a 4 ESS switch, formerly manufactured by AT&T. After receiving the call, the switch 24 launches a query across a signaling link (shown by a dashed line) to a Service Control Point (SCP) 25 to seek instruction to process the call. In response to the query, the SCP 25, which typically comprises a database, will advise the switch 26 to route the call to the platform 22.

Upon receipt of the call, the platform 22 typically prompts the calling subscriber for validation, via a password or Personal Identification Number (PIN) to determine whether the subscriber is authorized to obtain such service, and to identify the account to which the costs, if any are billed. Note that the entity responsible for the IXC network 20 could choose to offer the voice-to-facsimile service without charge to all customers, thus obviating the need to prompt for any validation. After validating the voice subscriber, or alternatively, after receipt of the call if no validation is required, the platform 22 prompts the voice subscriber to speak the facsimile message intended for transmission to the facsimile machine 14. The voice subscriber speaks the message and the platform 22 translates the message into a corresponding bit map format or other such format suitable for transmission to the facsimile machine 14.

In addition to prompting for the facsimile message itself, the platform 22 also prompts the voice subscriber to identify the message recipient, i.e., the telephone number assigned to the facsimile machine 14. The voice subscriber may enter the telephone number of the facsimile machine 14 in several different ways. First, the voice subscriber could simply enter the number by entering the appropriate DTM signals via the keypad of the telephone set 12. Alternatively, the voice subscriber 12 could speak the digits of the telephone number, in which case, the platform 22 would translate the spoken digits into corresponding DTMF signals. Lastly, the subscriber could speak the name or other non-telephone number identifier of the recipient facsimile machine 14, whereupon the platform 22 would translate the identifier into a database query for receipt by the SCP 25 or another database (not shown). In response, the SCP 25, or such other database would return the telephone number of the facsimile machine 14.

Once the platform 22 has performed the speech-to-facsimile translation and has identified the telephone number of the facsimile machine 14 destined to receive the voice subscriber's message, the platform launches a call to the facsimile machine. In the illustrated embodiment, the local switch 16 serving the facsimile machine 14 is homed to a toll switch 26 in the network 20. Thus, to reach the facsimile machine 14, the platform 22 routes the intended facsimile message to toll switch 26 for routing to the local switch 18, which, in turn, delivers the call to the facsimile machine.

Typically, the voice subscriber will want some type of verification that the facsimile machine 14 received the facsimile message. To that end, the platform 22 typically possesses a link to a printer 28 that will print a receipt for mailing to the voice subscriber. Rather than print a receipt for each transmission, the platform 22 could electronically store each receipt and print it on demand. For example, following a successful facsimile transmission, the platform 22 could assign a transaction identifier, comprised of a combination of numeric and/or alphanumeric characters that identify the just-sent facsimile. A voice subscriber seeking a paper receipt would signal the platform 22 to provide a receipt, either immediately, or at a later time, by entering the transaction identifier.

The foregoing describes a technique for providing outbound voice-to-facsimile service.

The above-described embodiments merely illustrate the principles of the invention. Those skilled in the art may make various modifications and changes that will embody the principles of the invention and fall within the spirit and scope thereof.

What is claimed is:

1. A method for enabling a voice subscriber to send a facsimile message, comprising the steps of:

receiving an inbound call from a subscriber seeking voice-to-facsimile service at a platform in a telecommunications network that performs voice-to-facsimile conversion;

prompting the subscriber from the platform for a voice message the subscriber desires to send via facsimile;

prompting the subscriber from the platform to identify a recipient for the facsimile message;

translating the voice message received at the platform into a format suitable for transmission as a facsimile to the identified recipient;

launching a telephone call to the identified recipient from the platform; and transmitting the facsimile to the recipient.

2. The method according to claim 1 wherein the subscriber is identified by DTMF signals received in the telecommunications network corresponding to a telephone number associated with the recipient.

3. The method according to claim 1 wherein he subscriber is identified by spoken digits received by the telecommunications network corresponding to a telephone number associated with the recipient and wherein the network translates the spoken digits into DTWF signals in order to launch a call to the identified recipient.

4. The method according to claim 1 wherein:

a) the subscriber is identified by spoken information received by the telecommunications network corresponding to non-telephone number identifier corresponding to the recipient;

the network translates the spoken non-telephone number identifier into a database query launched to a database; and the network receives from the database the identity of the recipient.

5. The method according to claim 1 further including the steps of:

prompting the voice subscriber for an authenticating password or PIN; and validating the subscriber to determine if the subscriber is authorized to obtain voice-to-facsimile service.

* * * * *